UNITED STATES PATENT OFFICE.

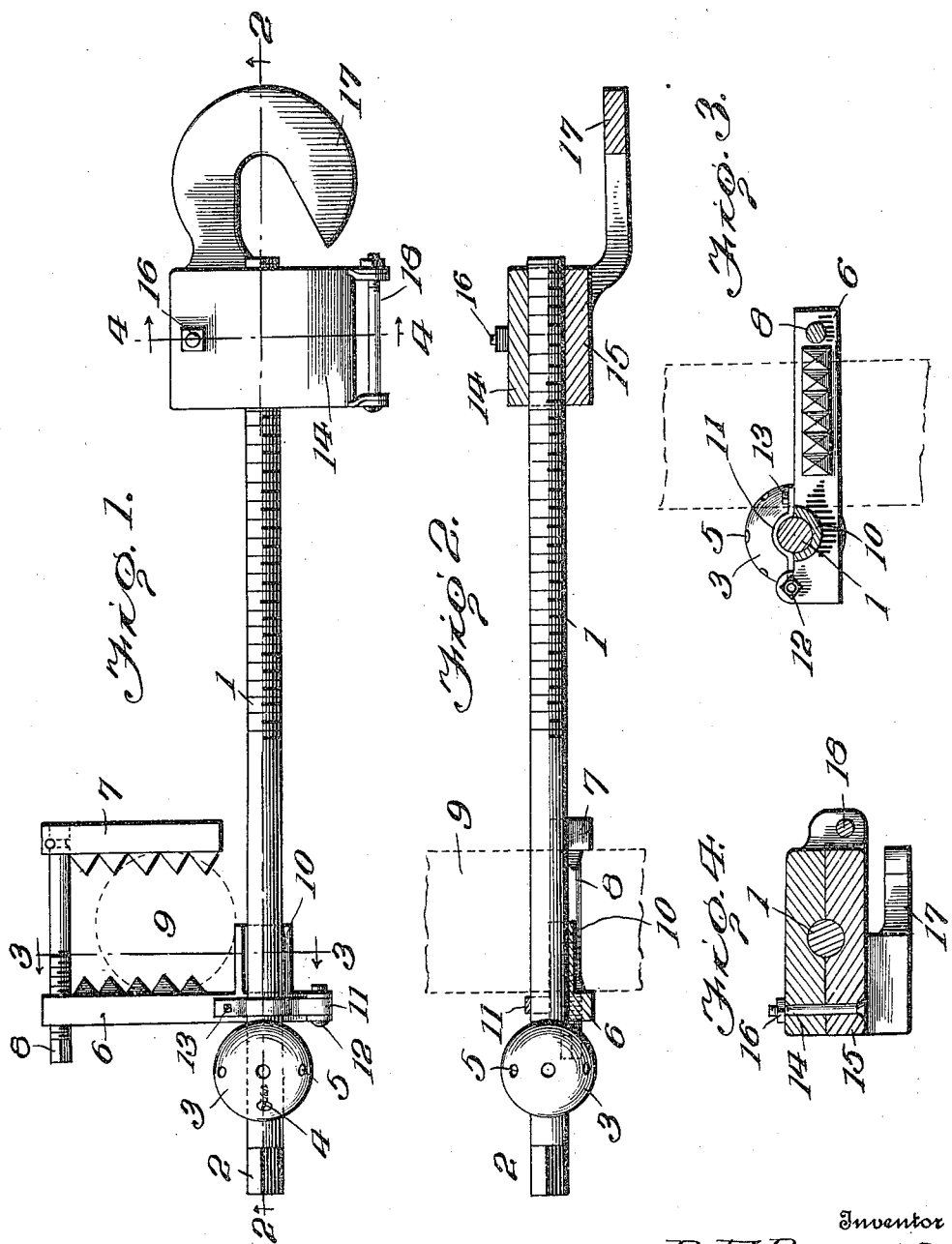

BENJAMIN F. DEWEES, OF LOGAN, WEST VIRGINIA.

POWER DEVICE.

1,159,906. Specification of Letters Patent. Patented Nov. 9, 1915.

Application filed March 29, 1915. Serial No. 17,758.

*To all whom it may concern:*

Be it known that I, BENJAMIN F. DEWEES, a citizen of the United States, residing at Logan, in the county of Logan and State of West Virginia, have invented certain new and useful Improvements in Power Devices, of which the following is a specification.

The invention provides a tool susceptible of general application for stretching strands, lifting loads and moving heavy objects, the tool being of such formation as to be readily and easily manipulated and adapted for the particular work in hand.

The invention provides a tool of the character stated embodying a power screw, a clamp and a work engaging device, the clamp serving as attaching means for securing the tool to a post, support or like part and the work engaging device providing attaching means for connecting the part to be moved to the tool, one of the parts having screw thread connection with the power screw and the other part being connected to the power screw by means of a swivel joint.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings:—Figure 1 is a top plan view of a tool of special design embodying the invention; Fig. 2 is a longitudinal section on the line 2—2 of Fig. 1, the power screw and head thereof being shown in full lines; Fig. 3 is a section on the line 3—3 of Fig. 1 looking to the left, as indicated by the arrows; Fig. 4 is a section on the line 4—4 of Fig. 1 looking to the right.

Corresponding and like parts are referred to in the following description and indicated in all the views of the drawings by the same reference characters.

The power screw 1 may be of any length and diameter and is provided at one end with a polygonal portion 2 for the reception of a wrench or like tool for turning the screw when the device is in operation. A head 3 is provided near one end of the power screw and is adapted to sustain the end thrust when the tool is in service. In the preferable construction the head 3 consists of a cast metal ball which is slipped upon the power screw and retained in place by suitable fastening means, such as a set screw 4. Openings 5 are formed around the head 3 to receive a rod or analogous device to admit of the power screw being conveniently turned when a wrench is in the hand or when it is more convenient to employ a rod or bar for turning the power screw.

The clamp is mounted upon the end portion of the power screw provided with the head 3 and comprises members 6 and 7 and an adjusting screw 8, the latter serving to connect the members 6 and 7 and draw them against opposite sides of a post 9 or like part to which the tool is to be attached. The adjusting screw 8 has screw thread connection with one of the members and swivel connection with the remaining member. One end of the adjusting screw is made polygonal for convenience to receive a wrench, whereby the adjusting screw may be turned when tightening or loosening the clamp. The member 6 is longer than the member 7 and receives the power screw 1. An edge of the member 6 is notched to form a seat in which the power screw 1 is fitted and a guide 10 projects laterally from the member 6 in line with the notch thereof and receives the power screw, such guide being of semicircular form, as indicated most clearly in Fig. 3, thereby engaging opposite sides and the lower portion of the power screw and retaining the clamp in proper position without any tendency to bind. A cap-piece 11 extends over the notch of the member 6 and retains the power screw in place in the notch and guide 10. The cap-piece 11 is hinged at one end to the member 6, as indicated at 12, and its opposite end is made secure by means of a fastening 13. By removing the fastening 13 the cap-piece 11 may be thrown upward at its free end thereby admitting of the clamp being removed from the power screw or placed in position thereon. The guide 10 preferably forms a part of the member 6 and is of such length as to hold the clamp in a given relative position without producing any binding action between the clamp and power screw which would tend to interfere materially with the efficiency of the device. The inner or gripping faces of the members 6 and 7 are toothed or roughened so as to insure positive engagement with the part gripped between the members 6 and 7 and thereby prevent any possible slipping.

The work engaging device comprises a nut and a hook, the latter being typical of any appliance adapting the tool to be engaged with the part to be moved, such as a load or a strand. The nut preferably embodies members 14 and 15 which are hingedly connected at one end and secured at the opposite end by means of a fastening 16. The hook 17 projects from the member 15 and is offset therefrom so as to lie in a different plane and enable the power screw to clear the work when the nut is moved to cause the end portion of the power screw to project. The members 14 and 15 are hingedly connected by means of a pintle 18 which preferably passes through apertured ears projecting from adjacent ends of the members 14 and 15. Depressions are formed in the meeting faces of the members 14 and 15 and such depressions register and form an opening when the members 14 and 15 are drawn together and such opening is threaded to match the screw threads of the power screw. The two part formation of the nut enables the work engaging device to be cast or stamped.

In the operation of the device the clamp is engaged with a suitable support or part and the work engaging device is connected with the load or part to be moved. The power screw is turned so as to draw the clamp and work engaging device together thereby moving the load or stretching the part to be drawn. For stretching a wire fence the clamp is attached to a fence post and the work engaging device is connected with the fence and upon turning the power screw the work engaging device is drawn toward the clamp and the fence attached thereto is stretched.

The general application of the tool will be manifest to those accustomed to the manner of use of devices of a nature similar to the present invention, hence it is not deemed necessary to exemplify the several uses for which the device is susceptible.

Having thus described the invention, what is claimed as new is:—

1. In a device of the character specified, the combination of a power screw, and a work engaging device having screw thread connection with the power screw and comprising two members and a hook projecting from one of such members, the said members being hingedly connected at one end and adapted to be secured by suitable fastening means at the opposite end.

2. A device of the character specified, comprising a power screw having an enlargement forming in effect a head, and a clamp mounted upon the power screw and comprising two members and an adjusting screw connecting such members, one of the members being longer than the other and receiving the power screw and engaging the head thereof.

In testimony whereof I affix my signature in presence of two witnesses.

BENJAMIN F. DEWEES. [L. S.]

Witnesses:
 STERLING COLE,
 LUTHER S. MCNEELY.

Copies of this patent may be obtained for five cents each, by addressing the "Commissioner of Patents, Washington, D. C."